G. W. SHUTER.
SHEET METAL SHEARS.
APPLICATION FILED MAR. 9, 1916.
1,201,106.
Patented Oct. 10, 1916.
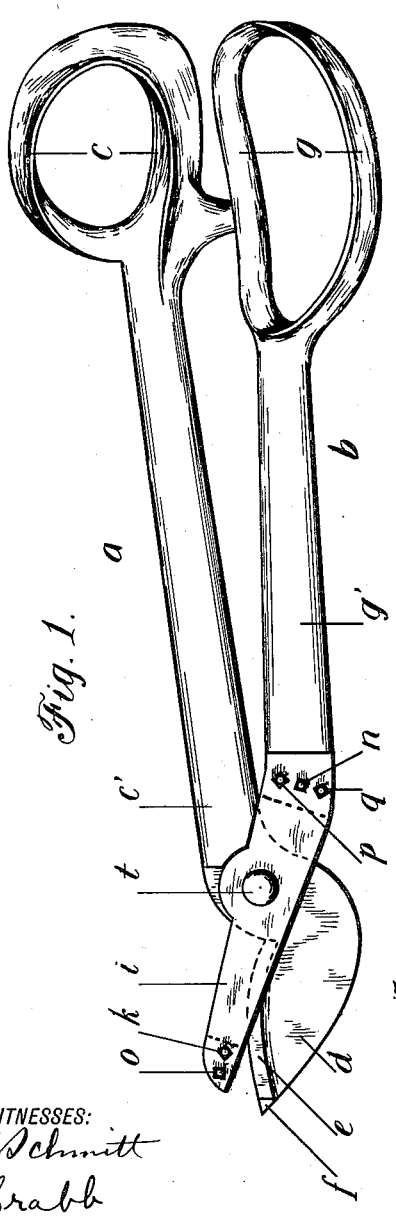
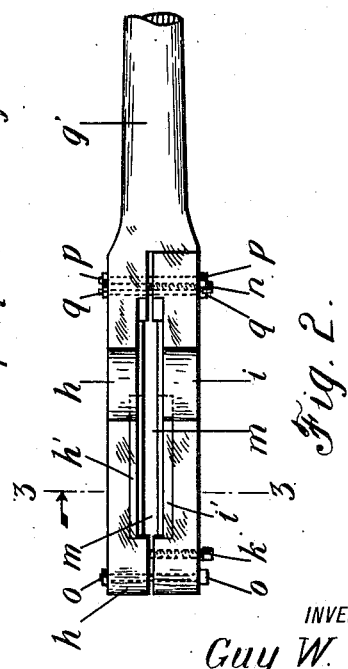
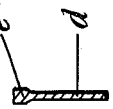
WITNESSES:
INVENTOR
Guy W. Shuter.
BY
ATTORNEY

UNITED STATES PATENT OFFICE.

GUY W. SHUTER, OF PORTLAND, OREGON.

SHEET-METAL SHEARS.

1,201,106.  Specification of Letters Patent.  Patented Oct. 10, 1916.

Application filed March 9, 1916. Serial No. 83,188.

*To all whom it may concern:*

Be it known that I, GUY W. SHUTER, a citizen of the United States, and a resident of Portland, county of Multnomah, State of Oregon, have invented a new and useful Improvement in Sheet-Metal Shears, of which the following is a specification.

My invention relates particularly to that type of shears used for cutting stovepipe, comprising coöperating shearing blades adapted to cut a strip of metal from the pipe without producing any rough edge on either length of pipe, which is caused when other types of shears are used.

One of the main objects of my invention is to construct one of the shearing blades with a movable side and to hold the latter movably in place by means permitting the space between the movable side and its fixed companion side to be adjusted. The purpose of this construction is to permit the sharpening of the shearing blade as required without affecting its efficiency in operation. In short, the opposed longitudinal faces of the slot of the shearing member preferably are faced with a harder material, so as to obtain a durable cutting edge, and such faces are inclined so as to maintain a sharp edge by grinding down the bottom surface of the cutting edges from time to time when worn dull, and my invention adapts the movable side to be set up toward the fixed side a compensating distance, so as to maintain the width of the slot of the blade constant throughout the life of the shears.

The details of construction and operation of my device are hereinafter fully described.

In the accompanying drawings; Figure 1 is a side elevation of a pair of shears embodying my invention, Fig. 2 is a plan or top view of a portion of the shearing member which embodies the details of my invention, Fig. 3 is a sectional view taken approximately on the line 3—3 of Fig. 2; this figure showing the construction of the inner faces of the slot of the blade, and Fig. 4 is a sectional view of the blade adapted to coöperate with the slot of the adjustable blade.

In the drawings, *a* and *b* represent the coöperating members of the shears. The member, *a*, consists of a handle, *c*, a shank, *c'*, and a cutting blade, *d*. The upper end of the blade, *d*, is made with a flat edge, *e*, as shown in Figs. 1 and 4, and its forward end is provided with a point, *f*, as shown in Fig. 1. This construction is well known. The member, *b*, of the shears comprises a handle, *g*, a shank *g'*, and a cutting blade. The latter includes the features which make up my invention and which are as follows: As illustrated in Fig. 2, the jaw-side, *h*, of this blade is formed integrally with the shank *g'*, while the jaw side, *i*, which is substantially identical with the side, *h*, is adjustably fixed to the side *h*, and these pieces thereby have a slot, *m*, formed between them. The inner longitudinal faces of the sides *h* and *i*, at the slot, are inclined toward each other, as shown in Fig. 3, and are provided with hardened steel faces, *h'*, *i'*, the lower ends of which constitute the cutting edges and are kept sharp by grinding down from time to time. Set-screws *k* and *n* are threaded in the side, *i*, and serve to adjustably hold the latter to the side, *h*, to maintain the longitudinal faces of the slot of the shearing blade in working relation with the sides of the head *e*, of the companion blade.

The operation of my device is as follows: When it is desired to cut a piece of stovepipe, the point *f*, is first thrust through the metal, so as to start the cut. The shears are then operated with the result that a thin strip of metal will be cut out from the pipe, leaving both ends of the separated pieces in good condition. This operation is common to shears of the type described. It is, however, found that the cutting edges of the shears soon become dull and require sharpening. In the process of sharpening, the sides *h*, *i*, of the blade are ground away on their lower faces (having reference to the parts as shown in Fig. 3); in so doing, the space of the slot, *m*, is gradually widened; and after a time the cutting edges of the blade are separated too much from the cutting edges of the head, *e*, of the blade *d* to work satisfactorily. By my improvement, the adjustable blade may be re-adjusted to its proper position after each process of sharpening; that is to say, that when the cutting edges, being the lower longitudinal faces of the slot, have become separated too much in the process of grinding, the set-screws *k* and *n* are loosened so as to permit the sides, *h*, *i*, to be relatively drawn together in order to restore them to their proper working position. The bolt *o*, *p*, *q*, are then tightened. By providing three bolts, *o*, *p*, *q*, arranged as shown in Fig. 1, the sides *h*, *i*, of the blade are held rigidly in place, and, furthermore, the movable jaw-side, *i*, may be properly alined and positioned with respect to its companion fixed-side *h*, so as to again render the shears in as good a condition after sharpening as before. The adjustment of my shears may be repeated indefinitely, with the result that the efficient life of my shears is indefinitely prolonged.

I claim:

1. In shears of the character described, a shearing-blade comprising a fixed side and a movable side having a slot between them, means for movably securing, at one point, the front end of the movable side to the fixed side, other means for movably securing the inner end of the movable side to the fixed side at two points transversely alined to the shearing blade, and means for spacing the movable side from the fixed side located at the front and inner ends of said securing means.

2. In shears of the character described, a shearing-blade comprising a fixed side and a movable side having a slot between them, means for movably securing, at one point, the front end of the movable side to the fixed side, other means for movably securing the inner end of the movable side to the fixed side at two points transversely alined to the shearing blade, and means for spacing the movable side from the fixed side located at the front and inner ends of said securing means, said spacing means longitudinally alined with the shearing blade, being located in a line common to both said securing means and intersecting approximately the center of the line of which said two points of the securing means provided at the inner end of the movable side are located.

3. In shears of the character described, a shearing-blade comprising a fixed side and a movable side having a slot between them, means for movably securing, at one point, the front end of the movable side to the fixed side, other means for movably securing the inner end of the movable side to the fixed side at two points transversely alined to the shearing blade, and means for spacing the movable side from the fixed side located at the front and inner ends of said securing means, a bolt connecting the movable side with the fixed side at the front or outer end, two bolts transversely alined to the shearing blade, connecting said movable side to the fixed side at the inner end, spacing screws inserted in one side and bearing against the other, such spacing screws located at the outer and inner ends of the shearing blade, being longitudinally alined with the latter on a line intersecting approximately the center of the line on which said transversely alined bolts are located.

GUY W. SHUTER.